(12) United States Patent
Oneda et al.

(10) Patent No.: US 9,174,369 B2
(45) Date of Patent: Nov. 3, 2015

(54) AGITATING FEEDER AND COMPRESSION MOLDING MACHINE

(75) Inventors: Yoshitsugu Oneda, Kyoto (JP); Hidehiro Nihei, Kyoto (JP)

(73) Assignee: KIKUSUI SEISAKUSHO LTD., Kyoto-shi, Kyoto (JP)

( * ) Notice: Subject to any disclaimer, the term of this patent is extended or adjusted under 35 U.S.C. 154(b) by 457 days.

(21) Appl. No.: 13/449,203

(22) Filed: Apr. 17, 2012

(65) Prior Publication Data

US 2012/0269919 A1 Oct. 25, 2012

(30) Foreign Application Priority Data

Apr. 19, 2011 (JP) .............................. P2011-092867

(51) Int. Cl.
*B30B 11/00* (2006.01)
*B29C 43/34* (2006.01)
*B30B 11/08* (2006.01)
*B30B 15/30* (2006.01)

(52) U.S. Cl.
CPC ................ *B29C 43/34* (2013.01); *B30B 11/08* (2013.01); *B30B 15/302* (2013.01); *B30B 15/304* (2013.01)

(58) Field of Classification Search
CPC ................ B29C 43/34; B29C 2043/34; B29C 2043/3427; B29C 2043/3444; B29C 2043/345; B30B 15/183; B30B 15/30; B30B 15/302; B30B 15/304; B30B 15/308

USPC ......... 425/209, 344, 353, 345, 354, 398, 193, 425/195

See application file for complete search history.

(56) References Cited

U.S. PATENT DOCUMENTS 4,156,546 A * 5/1979 Hine et al. ...................... 406/23
5,544,951 A * 8/1996 Alack ......................... 366/163.2

FOREIGN PATENT DOCUMENTS

| JP | S60-232329 A | 11/1985 |
| JP | 3052283 | 9/1998 |
| JP | 2007-210022 A | 8/2007 |

OTHER PUBLICATIONS

Japanese Office Action dated Feb. 10, 2015.

* cited by examiner

*Primary Examiner* — Yogendra Gupta
*Assistant Examiner* — Ninh Le
(74) *Attorney, Agent, or Firm* — McGinn IP Law Group PLLC

(57) ABSTRACT

An agitating feeder is provided in a compression molding machine that includes at least one die having a die bore, an upper punch and a lower punch retained respectively above and below the die so as to be vertically slidable, and a compression mechanism for compressing and molding a powdery material filled in the die bore by the upper punch and the lower punch. The agitating feeder includes an agitating rotor for rotating to agitate the powdery material, a housing accommodating the agitating rotor, and a gas flow device for flowing gas in the housing.

17 Claims, 11 Drawing Sheets

AGITATING FEEDER AND COMPRESSION MOLDING MACHINE

BACKGROUND OF THE INVENTION

There has been known a compression molding machine including an agitating feeder that agitates a powdery material and feeds the agitated powdery material in a die, in order to uniformly fill the powdery material in the die. The agitating feeder includes a housing and agitating rotors that are accommodated in the housing and rotate in directions opposite to each other. While agitating a powdery material in the housing, the agitating feeder fills the powdery material in each die that passes below the agitating rotors, so that the powdery material is filled in the respective dies uniformly in terms of quantity. The agitating rotors are mounted in the housing so as to rotate above a turret with no contact made therebetween (refer to Japanese Registered Utility Model Publication No. 3052283, for example).

However, in a case where a particularly fine powdery material is filled in a die bore, the powdery material aggregates in some cases and may not flow smoothly. As a result, the powdery material may not be uniformly filled in a die bore. Further, the powdery material may be accumulated in a region downstream in the rotation direction of the turret accommodated in the housing, and the powdery material may leak through a gap between the agitating feeder and a die table of the turret.

SUMMARY OF THE INVENTION

It is an object of the present invention to improve flowability of a powdery material in an agitating feeder, improve uniformity in filling the powdery material in a die bore, and prevent the powdery material from leaking through a gap between the agitating feeder and a die table of a turret.

Specifically, an agitating feeder according to the present invention is provided in a compression molding machine that includes at least one die or a die table having a die bore, upper and lower punches retained respectively above and below the die so as to be vertically slidable, and a compression mechanism for compressing and molding a powdery material filled in the die bore by the upper and lower punches. The agitating feeder includes an agitating rotor that rotates to agitate the powdery material, a housing that accommodates the agitating rotor, and a gas flow device that allows gas to flow in the housing.

In the above configuration, the gas flow device allows gas to flow in the housing. Accordingly, the powdery material is agitated also by the flowing gas in the housing. Therefore, flowability of the powdery material is improved, which leads to improvement of uniformity in filling the powdery material in the die bore. Further, the powdery material is prevented from leaking through the gap between the agitating feeder and the die table of the turret. Moreover, gas flowing in the housing smoothens rotation of the agitating rotor, so as to flow a powdery material that does not flow only by the rotation of the agitating rotor.

The "die table" in the present invention may be configured as a die provided with a die bore, or may be configured by providing a bore serving as a die bore directly in the table.

The gas flow device is not particularly limited as long as allowing gas to flow in the housing. The gas flow device is preferably configured to circulate gas in the housing, or in the housing as well as in the region of a powdery material supply mechanism, so as to flow the gas in the housing.

It is not necessary to continuously flow the gas in the housing. For example, the gas may be caused to flow in the housing upon deterioration of uniformity in filling the powdery material in the die bore, or at a predetermined interval.

As an example of a simple configuration for the agitating feeder, the gas flow device may include, in the housing, a first gas flowing rotor for delivering gas upward, a gas passage allowing the gas delivered by the first gas flowing rotor to flow therethrough, and a second gas flowing rotor for delivering downward the gas having flown through the gas passage. In such a configuration, the gas circulates in the housing, or in the housing as well as in the region of the supply mechanism. Therefore, flowability of the powdery material can be improved.

As an example of a specific configuration for the agitating feeder that allows external gas to flow into the housing, the agitating feeder may include a gas supply passage that supplies external gas caused to flow into the housing, and an outlet bore portion that guides the gas from the gas supply passage into the housing.

As an example of a configuration for suppressing influence of variation in pressure in the housing on filling uniformity of the powdery material in the die bore, there may be included a pressure sensor that senses the pressure in the housing, and a pressure control mechanism that receives a pressure signal outputted from the pressure sensor and controls the pressure in the housing. When the powdery material is supplied into the housing from a powdery material supplier, the pressure in the housing is varied. However, the pressure in the housing can be kept within a predetermined range by controlling the pressure in the housing with use of the pressure control mechanism described above.

A compression molding machine including the agitating feeder described above achieves improvement of flowability of the powdery material, which therefore improves uniformity in filling the powdery material in the die bore. Moreover, the powdery material is prevented from leaking through a gap between the agitating feeder and the die table of the turret. Furthermore, the gas flowing in the housing smoothens the rotation of the agitating rotors, so as to flow a powdery material that does not flow only by the rotation of the agitating rotor.

It is noted that the "powdery material" in the present invention conceptually indicates collective fine solids, inclusive of collective particles such as granules and powdery bodies smaller than such particles.

DESCRIPTION OF THE PREFERRED EMBODIMENTS

Described below is a first embodiment of the present invention with reference to FIGS. 1 to 8.

Figure 1:
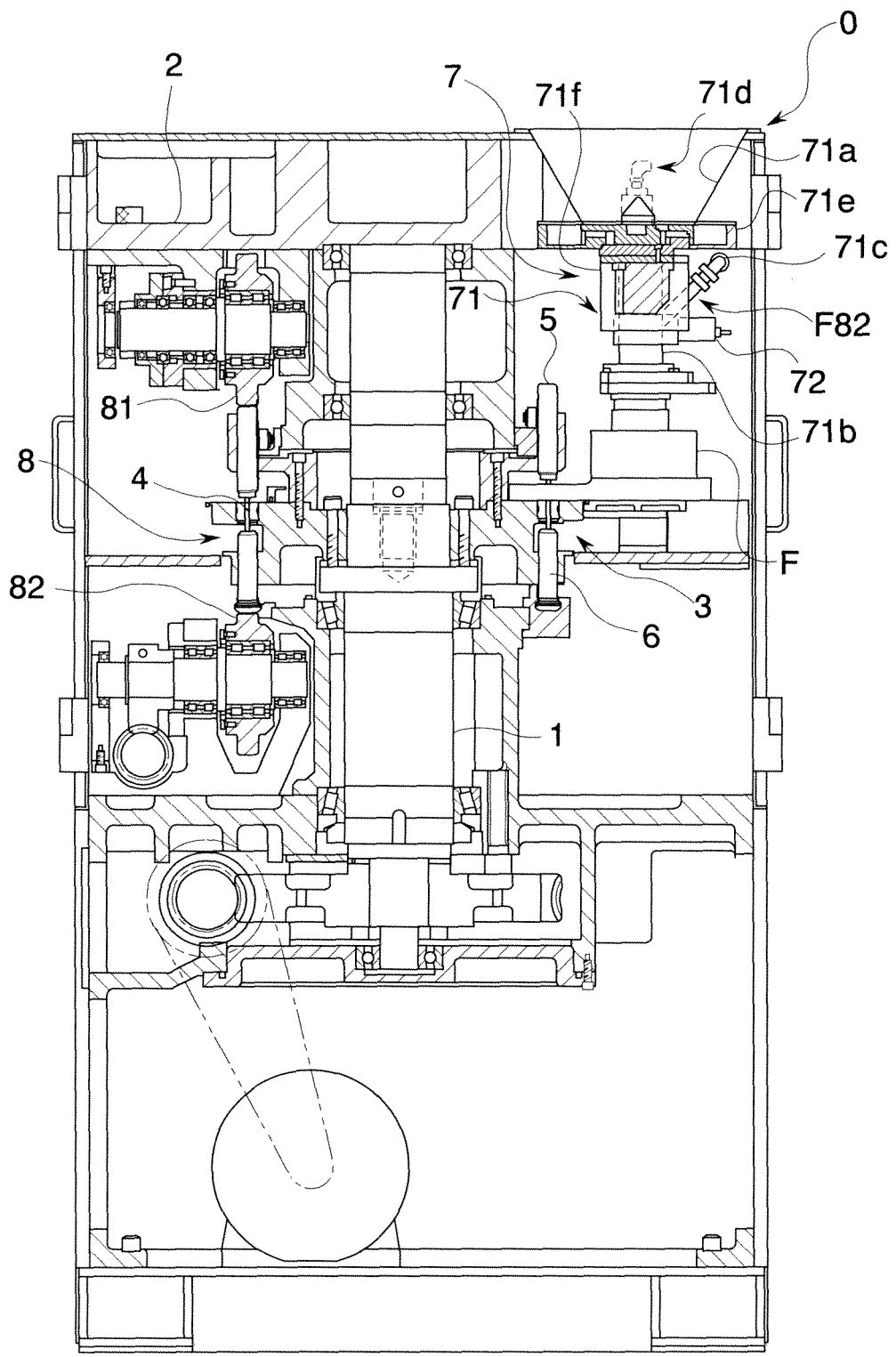
FIG. 1 is a sectional view of an entire configuration of a compression molding machine according to a first embodiment of the present invention.
Figure 2:
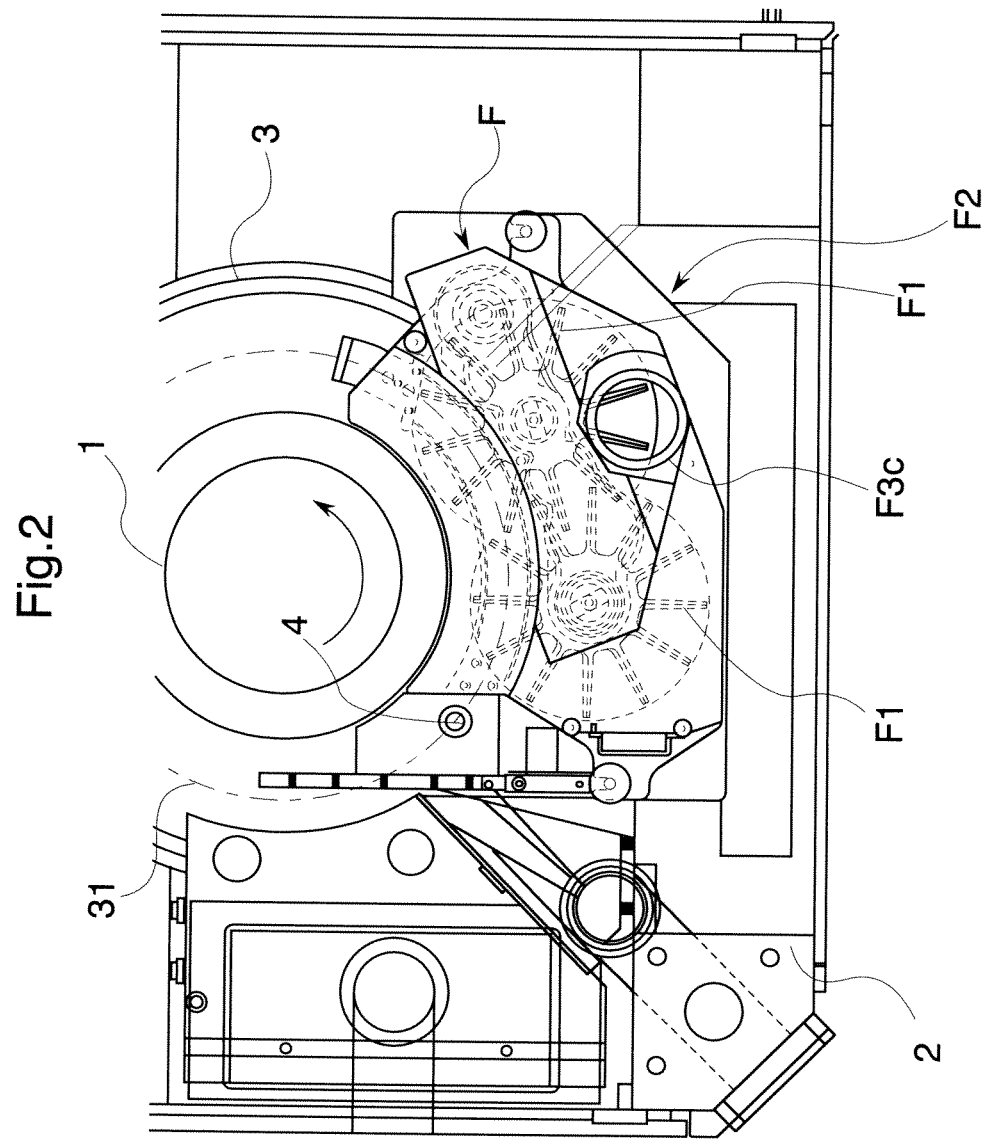
FIG. 2 a partial enlarged plan view showing a state where an agitating feeder according to the embodiment is mounted.
Figure 3:
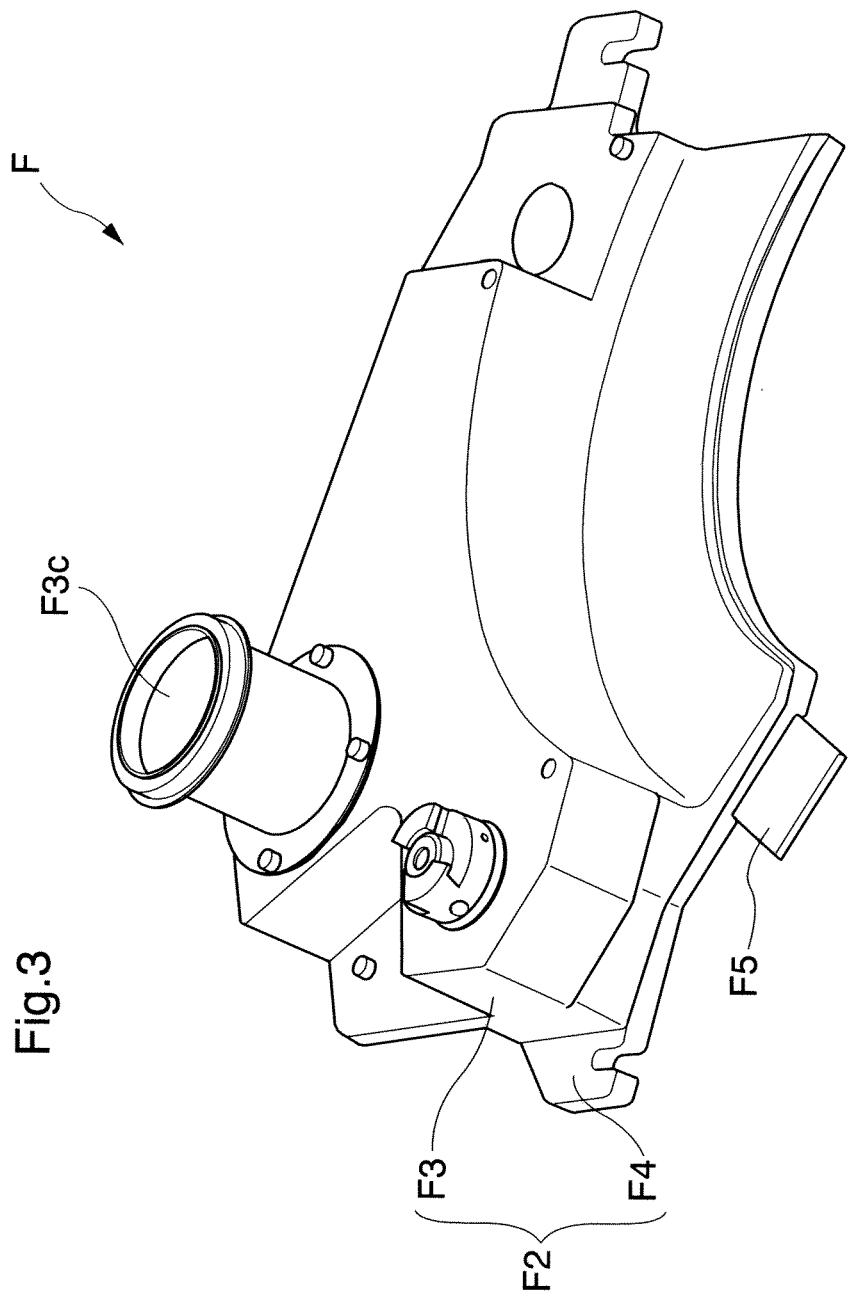
FIG. 3 is a perspective view entirely showing the agitating feeder according to the embodiment.

As shown in FIGS. 1 and 2, a rotary compression molding machine 0 includes an upright shaft 1, a frame 2, a turret 3, an upper punch 5, and a lower punch 6. The turret 3 serving as a die table is mounted to the upright shaft 1 in the frame 2 so as to be horizontally rotatable therein. The turret 3 is provided, at a predetermined pitch, with at least one die that has a die bore 4. The upper punch 5 and the lower punch 6 are retained respectively above and below each die bore 4 so as to be vertically slidable. The rotary compression molding machine 0 also includes a compression mechanism 8 for compressing and molding a powdery material filled in the die bore 4 by the upper punch 5 and the lower punch 6. The rotary compression molding machine 0 further includes a supply system 7 for filling the powdery material in the die bore 4. The supply system 7 is mounted so as to supply the powdery material from above the turret 3 toward a die table 31. There is provided, at a lower end of the supply system 7, an agitating feeder F that fills the powdery material in the die bore 4. This agitating feeder F is disposed so as to be pressed downward toward the die table 31.

The upright shaft 1, the frame 2, the turret 3, the die bore 4, and the upper punch 5 and the lower punch 6, as well as a mechanism for guiding the upper and lower punches 5 and 6, a mechanism for ejecting a molded product, a mechanism for rotating the upright shaft 1, and the like are basically configured similarly to those well known in the art. Therefore, these components will not be detailed herein.

As shown in FIG. 1, the supply system 7 guides the powdery material supplied into a hopper 71a to the agitating feeder F. The supply system 7 includes a supply mechanism 71. The supply mechanism 71 supplies the powdery material in the hopper 71a to a supplying pipe 71b. The supply mechanism 71 may be exemplified by a volumetric feeding device 71e that is provided with a detachable motor 71f. Due to provision of the volumetric feeding device 71e, a volumetric feeding rotor is rotated by the motor 71f, and the powdery material is supplied from the hopper 71a to the supplying pipe 71b. The hopper 71a is in communication with the supplying pipe 71b by way of the volumetric feeding device 71e, and is located at an upper end of the supplying pipe 71b. The supplying pipe 71b guides the powdery material discharged from the hopper 71a to the agitating feeder F. The supplying pipe 71b is provided, at an intermediate position, with a first degas bore 71c that is in communication with the outside of the supplying pipe 71b. The first degas bore 71c improves flowability of the powdery material in the supplying pipe 71b. Further, there is provided, above the supplying pipe 71b, a second degas bore 71d that allows the inside and the outside of the supplying pipe 71b to be in communication with each other. There is also provided, outside the supplying pipe 71b, a pass sensor 72. The pass sensor 72 is movable along the supplying pipe 71b, and senses the powdery material that passes through the supplying pipe 71b.

The compression mechanism 8 is also basically configured similarly to those well known in the art. As shown in FIG. 1, the compression mechanism 8 includes paired pre-compression rolls configured by a pre-compression upper roll 81 and a pre-compression lower roll 82, as well as paired main compression rolls configured by a main compression upper roll and a main compression lower roll (none of which being shown). In a state where distal ends of the upper punch 5 and the lower punch 6 are inserted into the die bore 4, the powdery material filled in the die bore 4 is compressed and molded while passing between the pre-compression upper roll 81 and the pre-compression lower roll 82, and then between the main compression upper roll and the main compression lower roll (none of which being shown). The upper rolls and the lower rolls configuring the compression mechanism 8 are located around the upright shaft 1 and respectively above and below the turret 3.

The agitating feeder F fills the powdery material in a space formed by the die bore 4 and the lower punch 6. The powdery material filled therein is leveled by a leveling plate F5, and is then compressed and molded by the upper punch 5 and the lower punch 6, as described earlier.

As shown in FIGS. 2 to 8, the agitating feeder F according to the present embodiment includes paired agitating rotors F1, and a housing F2. The paired agitating rotors F1 rotate in directions opposite to each other to agitate the powdery material on the turret 3. The housing F2 accommodates the agitating rotors F1.

Figure 4:
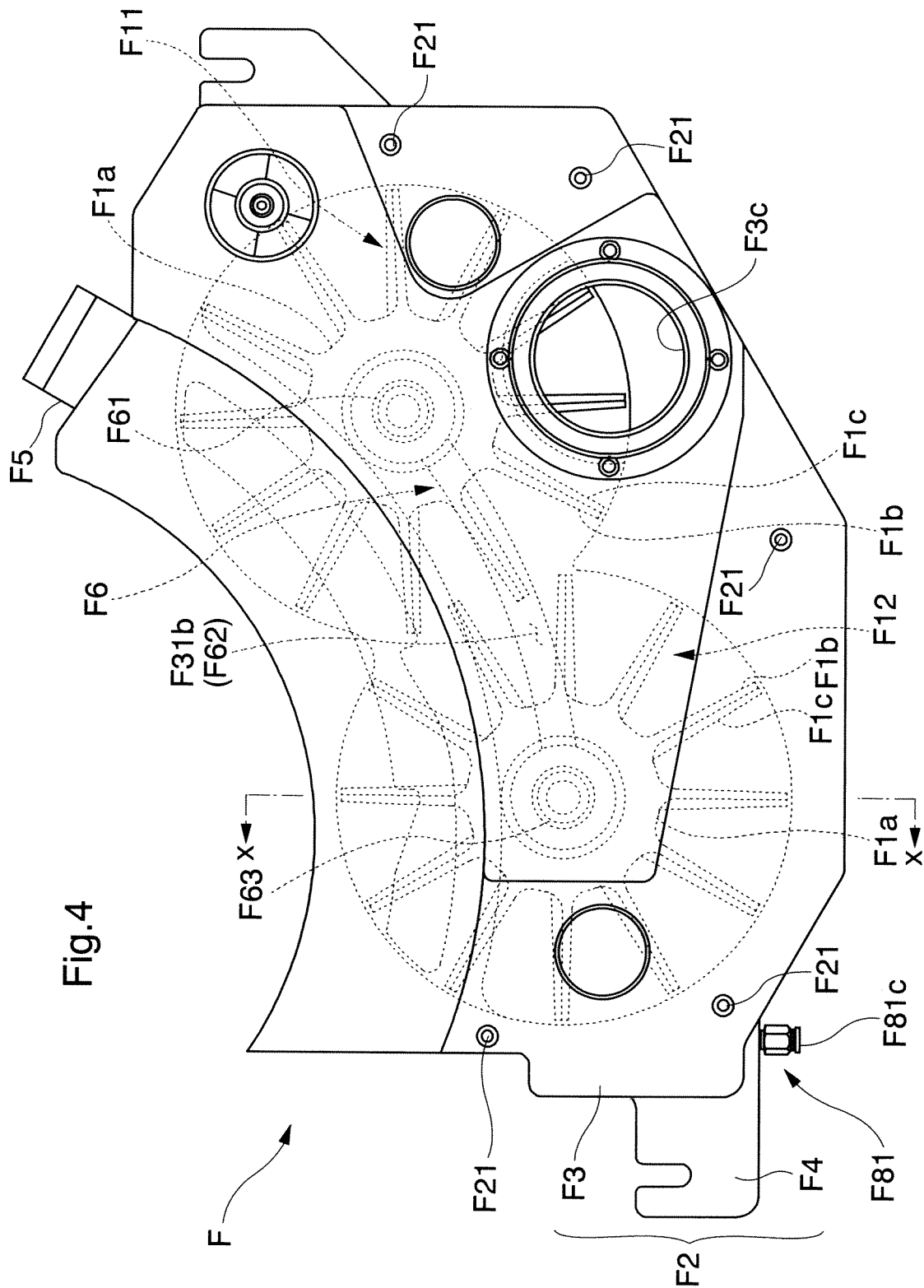
FIG. 4 is a plan view of the agitating feeder according to the embodiment.
Figure 5:
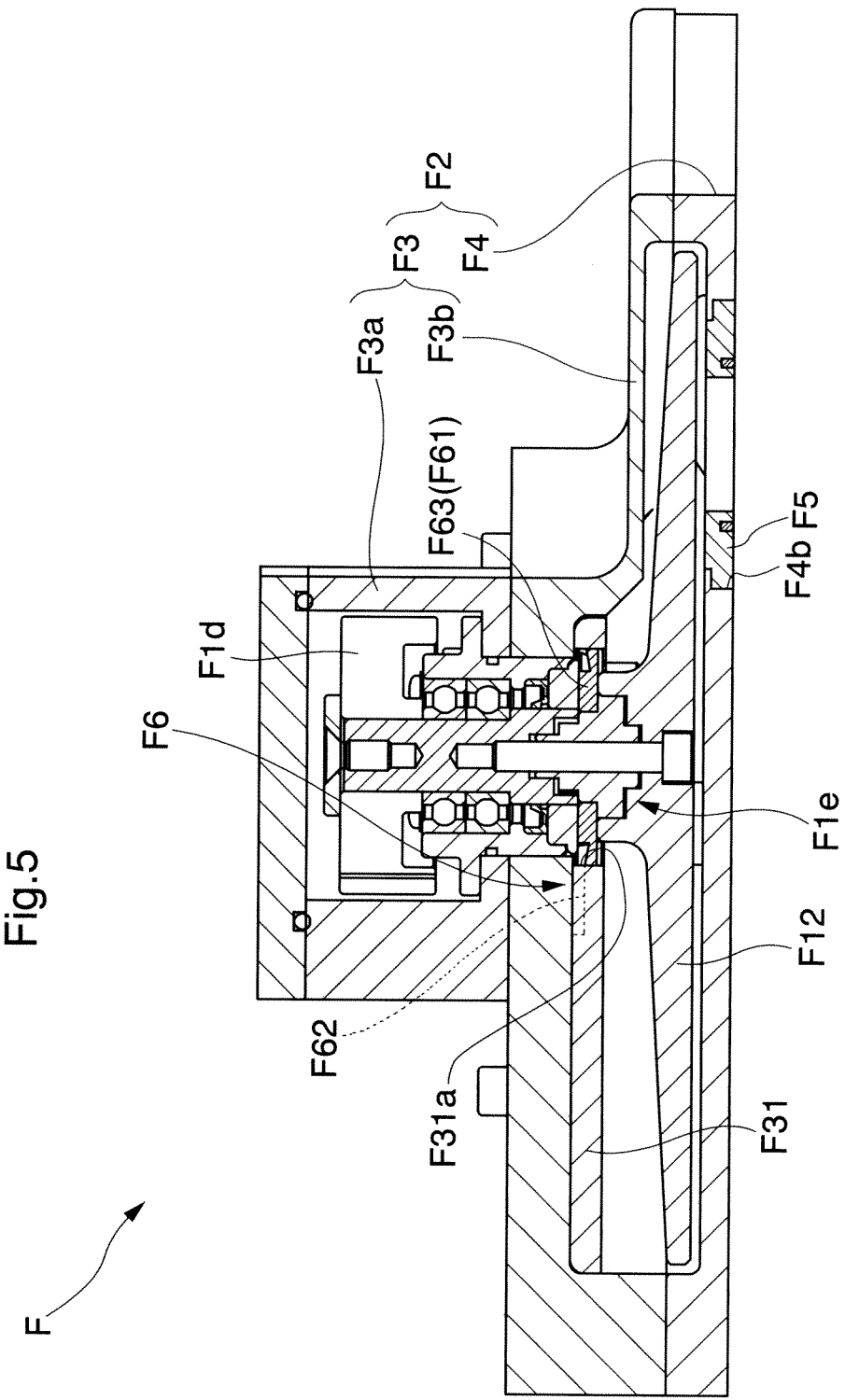
FIG. 5 is a sectional view taken along line x-x of FIG. 4.

As shown in FIGS. 4 and 5, the agitating rotors F1 each have an attachment flange F1a and a plurality of, twelve for example, blades F1b. Each of the agitating rotors F1 is configured such that the blades F1b, which are identical in length, extend radially from the attachment flange F1a located at the center. Each of the blades F1b has an agitating surface F1c that is inclined upward from the rotation direction. The right and left agitating rotors F1 are thus provided symmetrically with each other. Each of the agitating rotors F1 is driven by a gear F1d that receives driving power transmitted from a motor (not shown) by way of a gear train (not shown). The agitating rotors F1 are accommodated in a bottom space that is formed by a housing main body F3 configuring the housing F2 and a bottom plate member F4 attached to a bottom surface of the housing main body F3. The agitating rotors F1 are located substantially in the center in the longitudinal direction of the agitating feeder F, with distal ends thereof being overlapped with each other so as not to hit each other during rotation thereof. The agitating rotors F1 are mounted above and in no contact with an upper surface of a bottom plate F4a (to be described later) of the bottom plate member F4 of the housing F2, in other words, such that the lower surfaces of the agitating rotors F1 are spaced apart from the upper surface of the bottom plate F4a. Hereinafter, when the paired agitating rotors F1 are referred to with no distinction from each other, each of them is simply referred to as the "agitating rotor F1". Further, the agitating rotor F1 located downstream in the rotation direction of the turret 3 is referred to as the "first agitating rotor F11", while the agitating rotor F1 located upstream in the rotation direction of the turret 3 is referred to as the "second agitating rotor F12", respectively.

As shown in FIGS. 4 and 5, the housing F2 is assembled such that the bottom plate member F4 is detachably fixed to the bottom of the housing main body F3 by means of bolts F21. Each of the bolts F21 penetrates the housing main body F3 from above to reach the bottom plate member F4, while the distal end does not project from the lower surface of the bottom plate member F4. As shown in FIGS. 3 to 8, the housing main body F3 has an upper half portion provided with a first housing unit F3a that accommodates the driving gear F1d, and a lower half portion provided with a second housing unit F3b that accommodates the agitating rotors F1. The housing main body F3 is also provided, on the upper surface and at a position where the first housing unit F3a is not located, with a powdery material supply port F3c. This powdery material supply port F3c allows the second housing unit F3b to be in communication with the powdery material supply system 7. The second housing unit F3b has an inner space that is larger than the outer diameters of the agitating rotors F1. There is also provided a volume regulating plate F31 above the agitating rotors F1 in the second housing unit F3b. The agitating rotors F1 and the powdery material agitated by the agitating rotors F1 are accommodated in the space formed between the volume regulating plate F31 and the bottom plate member F4.

Figure 8:
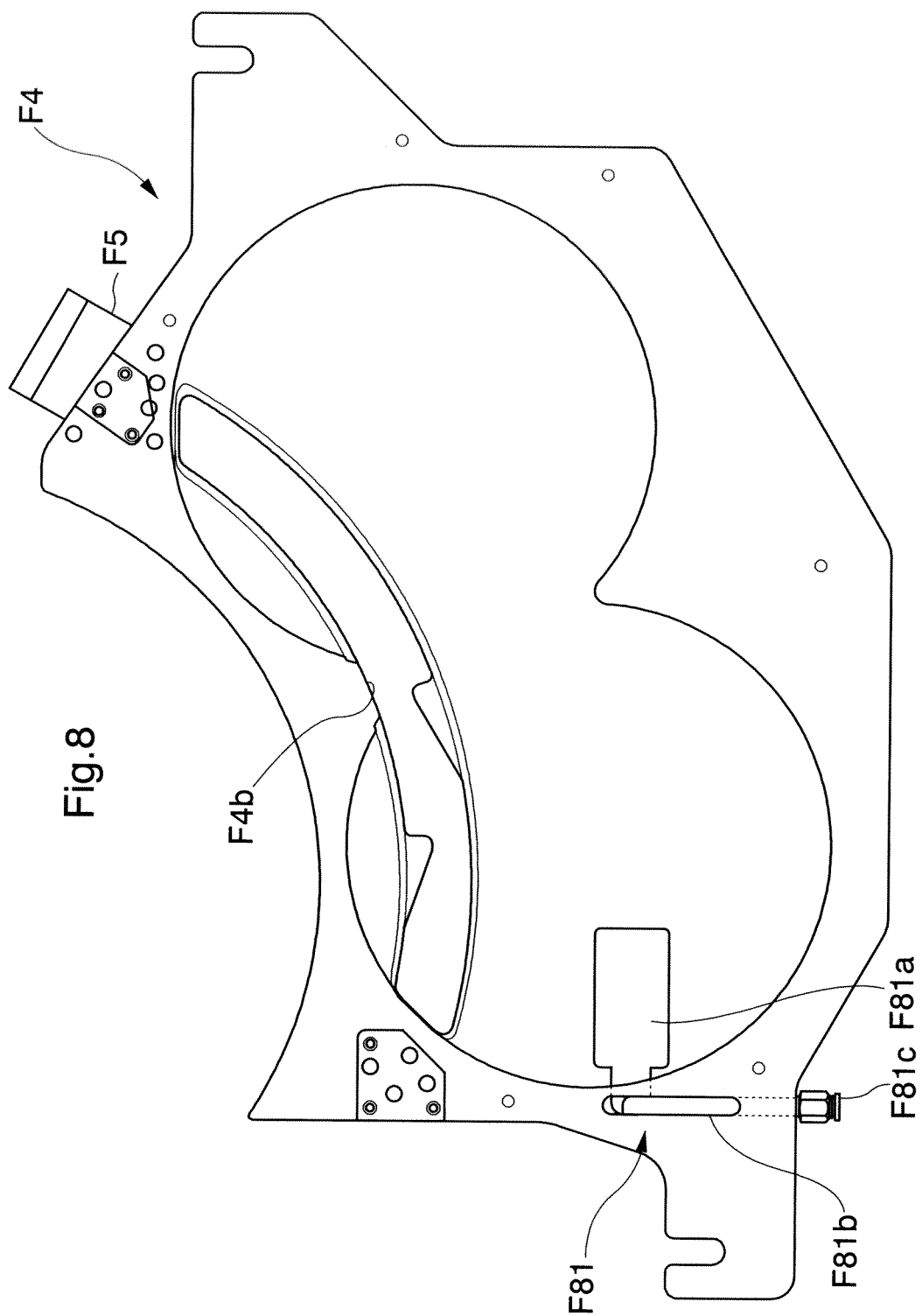
FIG. 8 is a plan view of a bottom plate included in the agitating feeder according to the embodiment.

As shown in FIG. 8, the bottom plate member F4 has a flat plate shape and closes most of a lower opening of the second housing unit F3b. The bottom plate member F4 is provided with a groove F4b in a circular arc shape, at a position included in the die bore 4 in a state where the agitating feeder F is mounted at a predetermined mounting position. Further, the groove F4b is provided, at a terminal end thereof, with the ing plate F5 for leveling the powdery material filled in the die bore.

As shown in FIGS. 4 and 5, in the present embodiment, there is also provided a gas flow device F6 that allows gas to flow in the housing F2.

As shown in FIGS. 4 and 5, the gas flow device F6 includes a first gas flowing rotor F61, a gas passage F62, and a second gas flowing rotor F63. The first gas flowing rotor F61 is supported by a shaft F1e that pivotally supports the first agitating rotor F11, and delivers gas (air in the present embodiment) to above the first agitating rotor F11. The gas passage F62 allows the air delivered by the first gas flowing rotor F61 to flow into the vicinity of the second agitating rotor F12. The second gas flowing rotor F63 is supported by the shaft F1e that pivotally supports the second agitating rotor F12, and delivers the air having flown through the gas passage F62 downward into the vicinity of the second agitating rotor F12. The second gas flowing rotor F63 is provided upstream in the rotation direction of the turret 3 with respect to the first gas flowing rotor F61.

Figure 6:
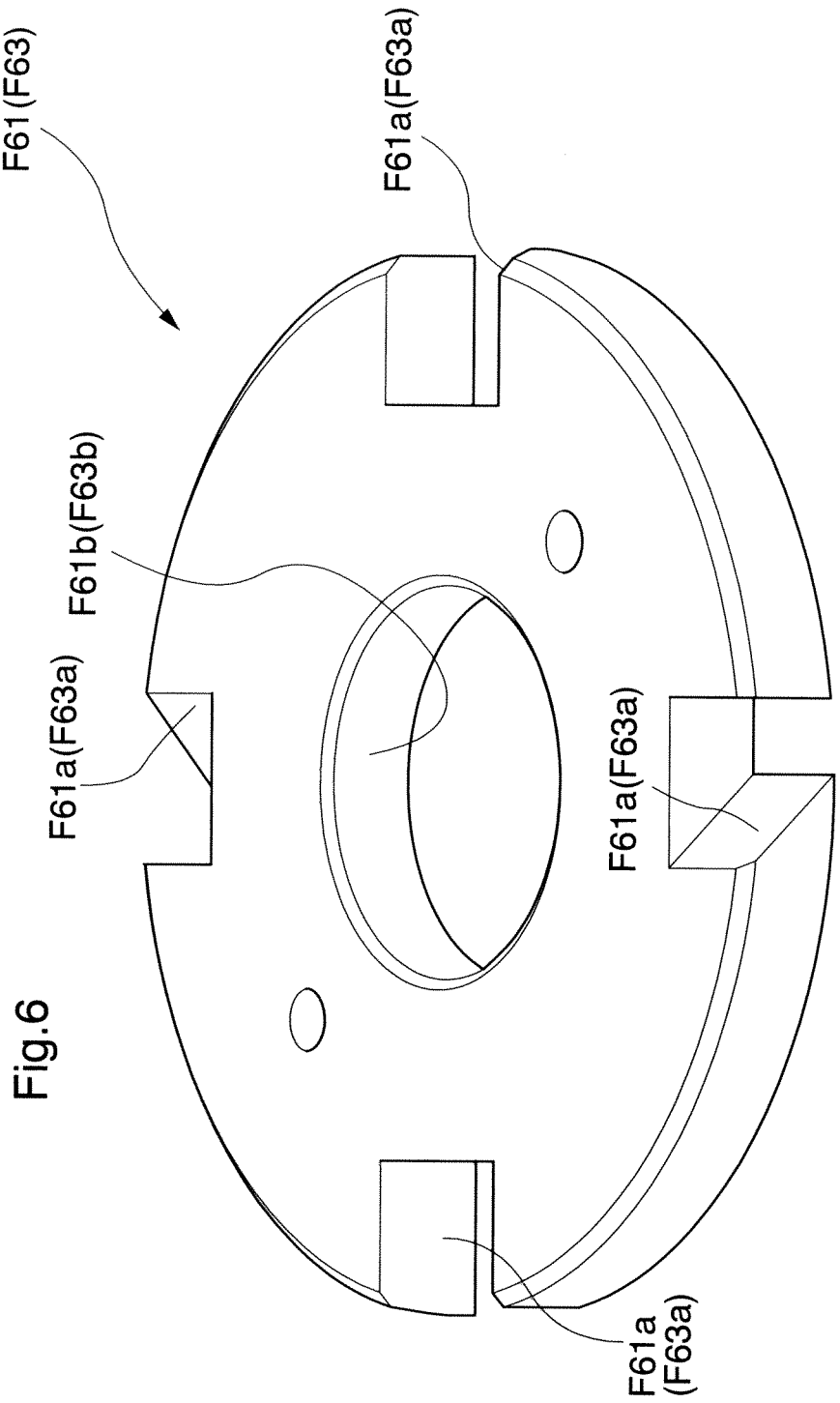
FIG. 6 is a perspective view of a gas flowing rotor included in the agitating feeder according to the embodiment.

As described above, the first gas flowing rotor F61 is supported by the shaft F1e that pivotally supports the first agitating rotor F11. As shown in FIG. 6, the first gas flowing rotor F61 has an agitating surface F61a that is inclined upward from the rotation direction, and a shaft through bore F61b that allows the shaft F1e to be inserted there through. The gas flowing rotor F61 rotates synchronously with the first agitating rotor F11, so that the air reaching the vicinity of the first agitating rotor F11 is guided to above the first agitating rotor F11, more specifically, to above the volume regulating plate F31. While FIG. 6 only shows the first gas flowing rotor F61, the second gas flowing rotor F63 may be configured identically with the first gas flowing rotor F61. In other words, the configuration of the second gas flowing rotor F63 may be obtained by vertically reversing the first gas flowing rotor F61. The second gas flowing rotor F63 is supported by the shaft F1e that pivotally supports the second agitating rotor F12. This second gas flowing rotor F63 rotates synchronously with the second agitating rotor F12. In other words, this second gas flowing rotor F63 rotates reversely to the first gas flowing rotor F61 at an identical speed. More specifically, the second gas flowing rotor F63 has an agitating surface F63a that is inclined downward from the rotation direction, and a shaft through bore F63b that allows the shaft F1e to be inserted therethrough. This second gas flowing rotor F63 rotates reversely to the first gas flowing rotor F61 at an identical speed. Accordingly, air reaches the vicinity of the first agitating rotor F11 and then flows reversely to the rotation direction of the turret 3 in the gas passage F62, which is subsequently guided downward into the vicinity of the second agitating rotor F12.

It is noted that the rotation speed of the first agitating rotor F11 may be different from that of the second agitating rotor F12, and the rotation direction of the former may be identical with that of the latter. In the case where the first agitating rotor F11 and the second agitating rotor F12 rotate in an identical direction, the first gas flowing rotor F61 is different in shape from the second gas flowing rotor F63, and these two rotors are respectively shaped so as to exert similar functions and effects.

Figure 7:
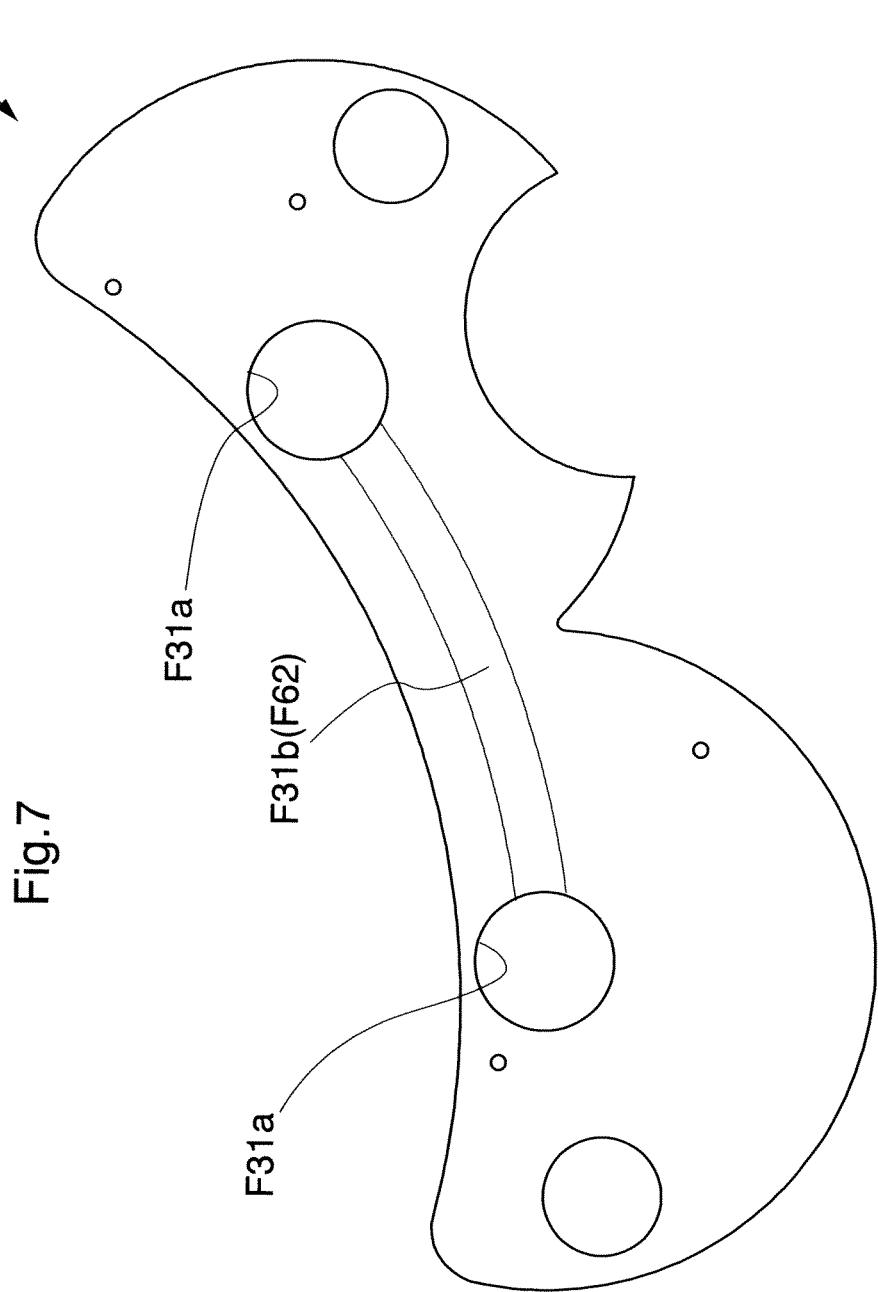
FIG. 7 is a perspective view of a volume regulating plate included in the agitating feeder according to the embodiment.

As shown in FIGS. 4, 5 and 7, the gas passage F62 in the present embodiment is configured by the volume regulating plate F31. More specifically, as shown in FIG. 7, the volume regulating plate F31 has bores F31a that allow the shaft F1e pivotally supporting the paired agitating rotors F1 to be inserted therethrough, and a concave groove F31b that is opened upward between these bores F31a. The gas passage F62 is configured as a space formed between the bottom of the concave groove F31b and the housing main body F3.

In the present embodiment, there are further included an air import portion F81 for guiding air into the housing F2, and an air exhaust portion F82 for exhausting air from the housing F2.

As shown in FIG. 8, the air import portion F81 has an outlet bore portion F81a and a gas supply passage F81b. The outlet bore portion F81a blows out air from below toward the bottom plate member F4 at a position in the vicinity of the second agitating rotor F12. The gas supply passage F81b supplies outside air toward the outlet bore portion F81a.

The outlet bore portion F81a is configured by a porous plate member. Air is allowed to flow upward from below the outlet bore portion F81a.

The gas supply passage F81b according to the present embodiment receives air supplied from an air pump (not shown) through a gas inlet port F81c, and guides the supplied air to below the outlet bore portion F81a.

The air exhaust portion F82 is configured by the supplying pipe 71b and the first degas bore 71c provided in the supplying pipe 71b. The air exhaust portion F82 may be located at any position. The air exhaust portion F82 may be provided in the upper surface of the housing main body F3, and is preferably provided above the bottom plate member F4.

In the present embodiment, positive pressure is applied to the vicinity of the second agitating rotor F12 due to the air flow caused by the second gas flowing rotor F63, while negative pressure is applied to the vicinity of the first agitating rotor F11 due to the air flow caused by the first gas flowing rotor F61. Accordingly, there is generated in the gas passage F62 a gas flow from the vicinity of the second agitating rotor F12 to the vicinity of the first agitating rotor F11, in a direction reverse to the rotation direction of the turret 3. More specifically, when the gas flow device F6 according to the present embodiment is in operation, air flows from the vicinity of the first agitating rotor F11 to the vicinity of the first agitating rotor F11 by way of the first gas flowing rotor F61, the gas passage F62, the second gas flowing rotor F63, and the vicinity of the second agitating rotor F12, in this order. In other words, air circulates in the housing F2.

The present invention is not limited to the embodiment described above, but may be modified in various ways.

Figure 9:
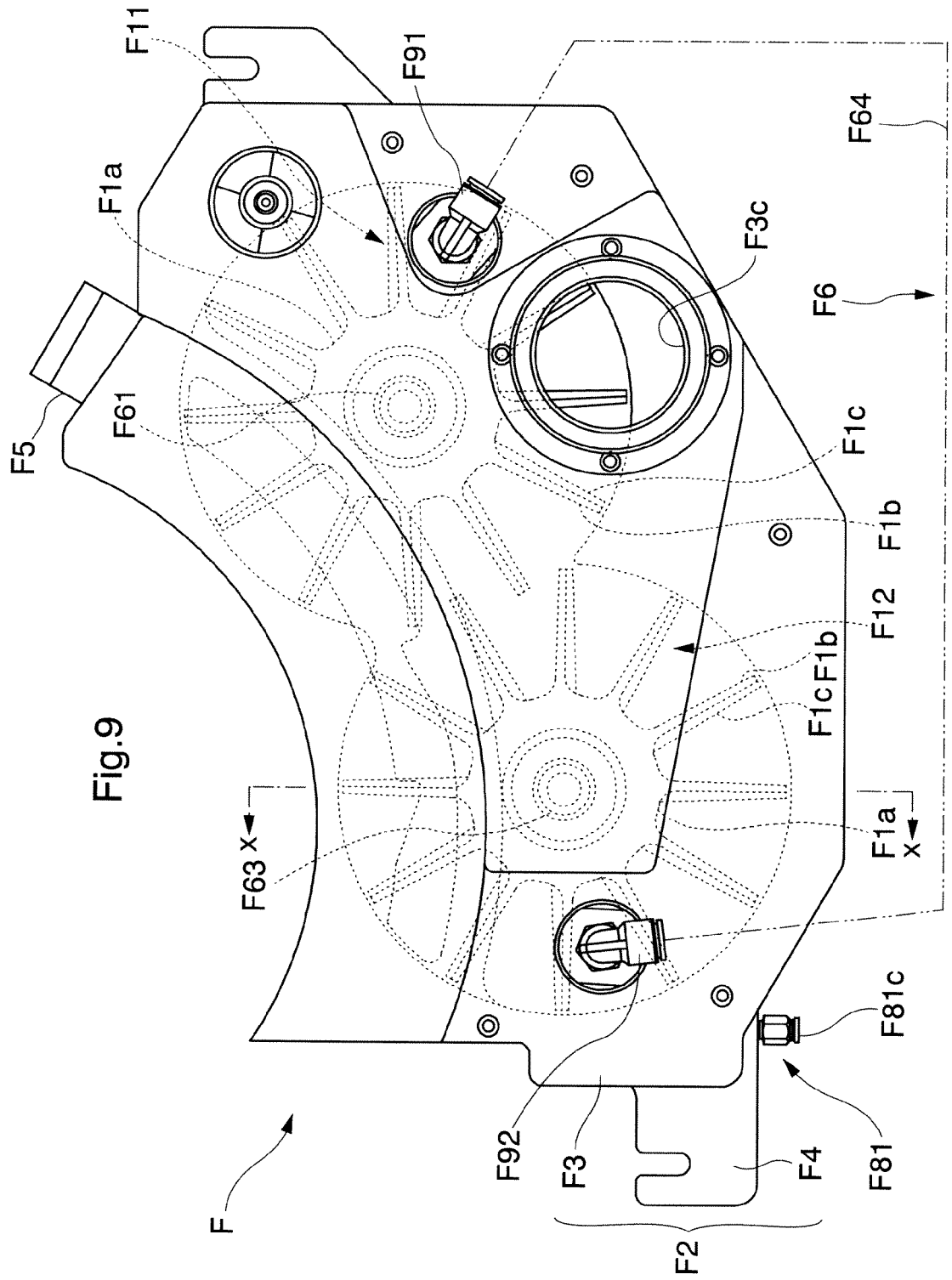
FIG. 9 is a sectional view of a main portion of an agitating feeder according to a second embodiment of the present invention.

The present invention may include the following configuration according to a second embodiment, for example. In this embodiment, the volume regulating plate F31 of the first embodiment is not provided, and there is provided a gas flow device F6 configured as described below. In the following description, portions corresponding to those of the first embodiment are named identically and denoted by the same symbols. The gas flow device F6 shown in FIG. 9 is configured as follows. There are provided first and second air flow ports F91 and F92 that allow the inside and the outside of the housing F2 to be in communication with each other. These first and second air flow ports F91 and F92 are in communication with each other via a gas passage F64 that is provided as a tube or the like (not shown). This configuration allows air to flow in the gas passage F64, from the first air flow port F91, which is located downstream in the rotation direction of the turret 3, to the second air flow port F92, which is located upstream in the rotation direction of the turret 3. Further, air is guided by the first gas flowing rotor F61 of the first embodiment, from the inside of the housing F2 into the gas passage F64 by way of the first air flow port F91. Then, the air is guided by the second gas flowing rotor F63 of the first embodiment, from the gas passage F64 into the housing F2 by way of the second air flow port F92. As a result, circulation of air is realized. Alternatively, there may be provided, in the gas passage F64, a gas flow promoting device such as a gas flow promoting rotor, which is driven by a motor, so that the air flow in the housing F2 is promoted. Flowability of the powdery material can be improved also by circulating air reversely to the above example.

Still alternatively, the first or second air flow port F91 or F92 may not be provided, and air exhausted from the air exhaust portion F82 of the above embodiment may be made to return into the housing F2, so as to be circulated. This configuration prevents the powdery material from leaking through the air exhaust portion F82.

Still alternatively to the use of the circulation of gas in the agitating feeder F as described above, there may be adopted a gas flow device that includes a gas importing device for importing gas such as air into the housing of the agitating feeder, and a gas exhausting device for exhausting gas such as air from the housing of the agitating feeder. This gas flow device utilizes the flow of gas from a gas outlet port of the gas importing device toward a gas exhaust port of the gas exhausting device. As one example, the volume regulating plate F31 of the first embodiment is not provided, and the air import portion F81 of the above embodiment is used as the gas importing device, and the air exhaust portion F82 of the above embodiment is used as the gas exhausting device.

Further, an exemplary configuration for stabilizing the powdery material in the agitating feeder F may include a pressure censor F7 and a pressure control system F8. The pressure sensor F7 senses the pressure in the housing F2. The pressure control system F8 receives a pressure signal outputted from the pressure sensor F7 to control the pressure in the housing F2.

Figure 10:
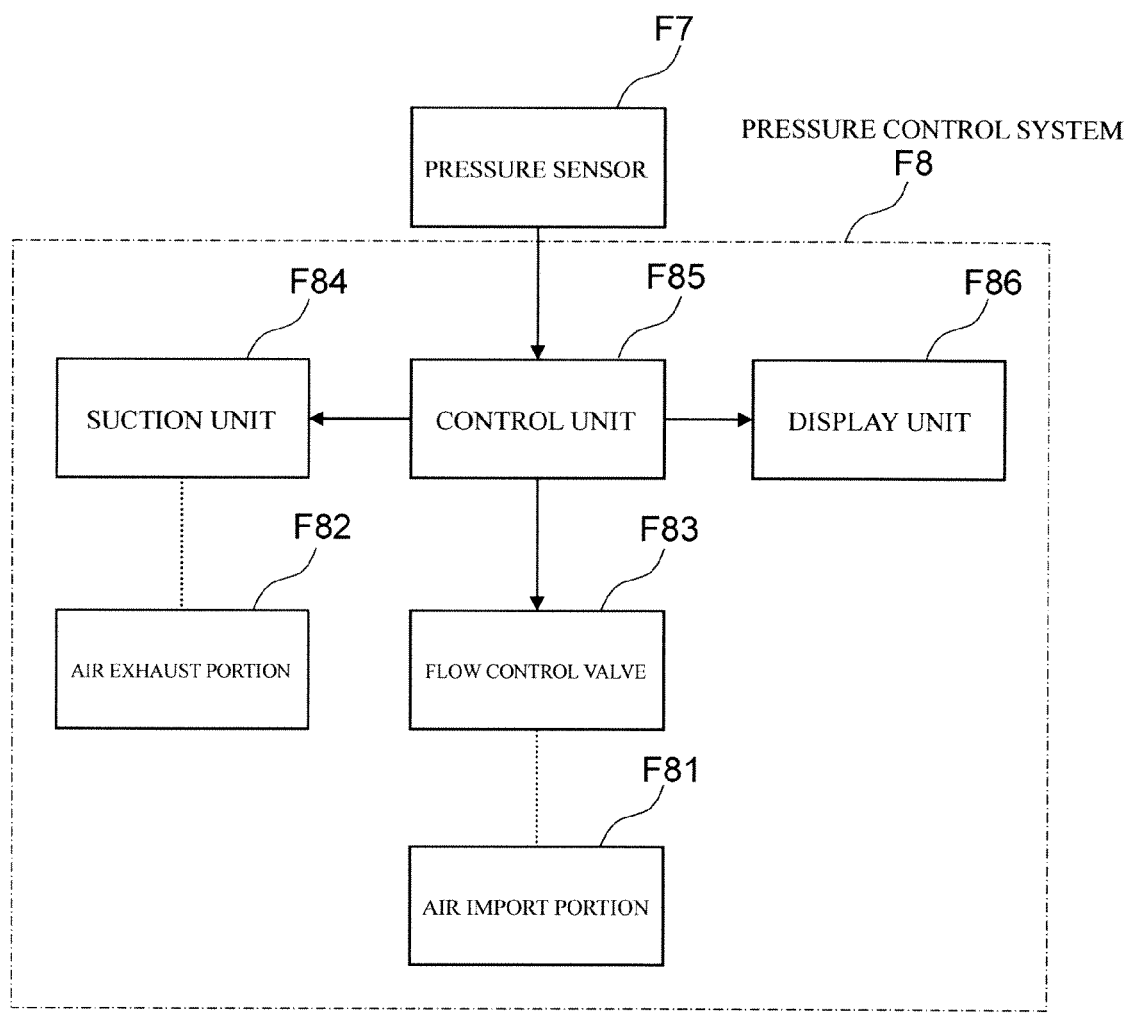
FIG. 10 is a functional block diagram of a control unit according to a different embodiment of the present invention.

As shown in FIG. 10, the pressure control system F8 includes the air import portion F81, a flow control valve F83, the air exhaust portion F82, a suction unit F84, a control unit F85, and a display unit F86. The flow control valve F83 controls the flow rate of air imported into the housing F2 through the air import portion F81. The suction unit F84 discharges air from the housing F2 through the air exhaust portion F82. The control unit F85 includes an import rate controller and a suction power controller. The import rate controller controls the rate of air imported into the housing F2 from the air import portion F81. The suction power controller controls suction power for sucking atmospheric air in the housing F2 through the first degas bore 71c. When the control unit F85 outputs an operation stop signal indicative of abnormality of the pressure in the housing F2, the display unit F86 receives the operation stop signal and visually indicates that the pressure in the housing F2 is abnormal. The pressure control system F8 controls the pressure in the housing F2 by controlling the rate of imported air and suction power with use of the import rate controller and the suction power controller, respectively, on the basis of the pressure in the housing F2 measured by the pressure sensor F7. The gas used in this case is not limited to air, but may be nitrogen, oxygen, inert gas, or any other kind of gas.

Although not shown, the control unit F85 is mainly configured by a computer system that includes a central processing unit, a storage unit, an input interface, and an output interface. The central processing unit executes a pressure control program stored in the storage unit and functions as a suction power measurement device and as the suction power controller, so as to control the pressure in the housing F2. More specifically, the central processing unit receives a signal from the pressure sensor F7 by way of the input interface, and transmits a control signal to each of the flow control valve F83 and the suction unit F84 by way of the output interface.

Figure 11:
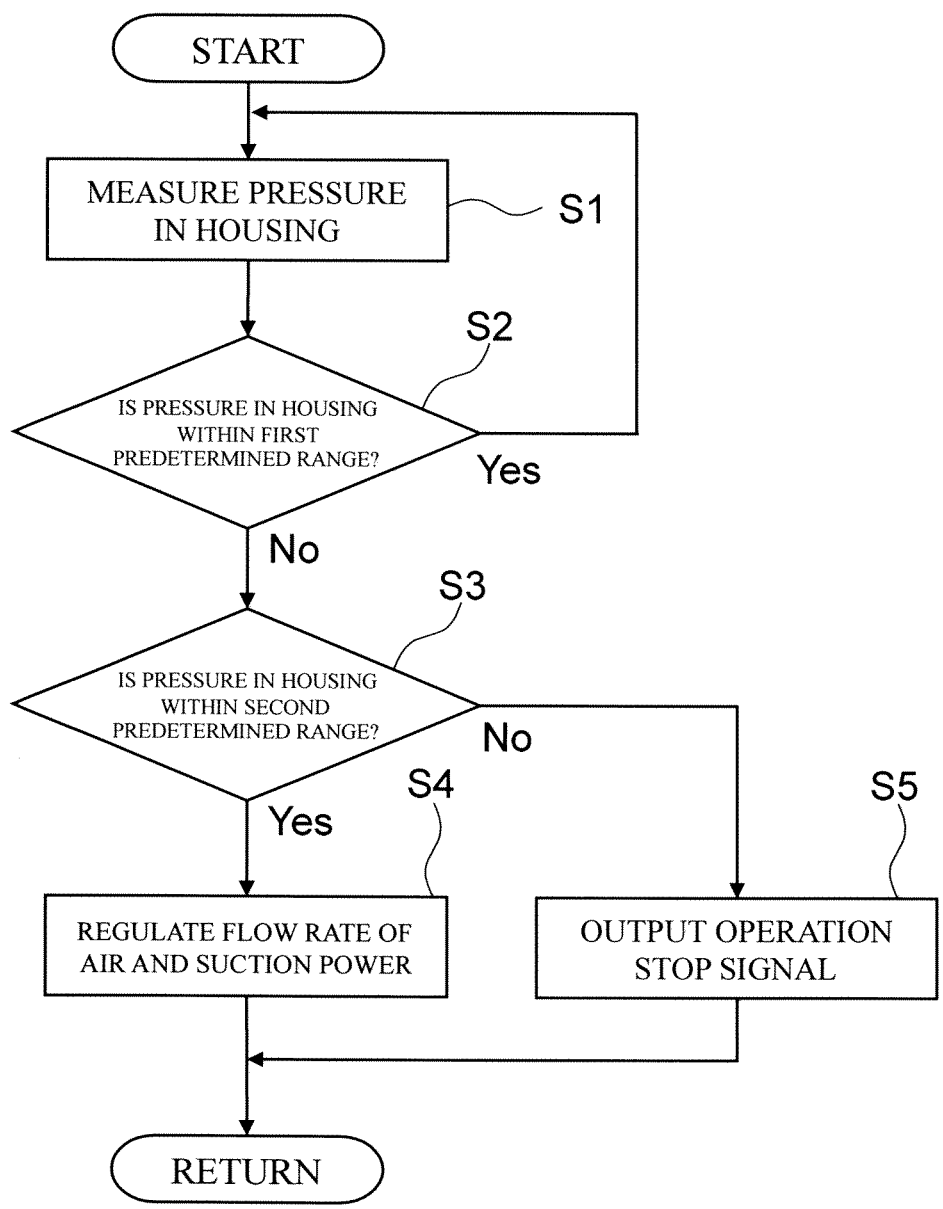
FIG. 11 is a flowchart showing steps in a control operation that is performed by the control unit according to the different embodiment of the present invention.

The control process performed by the control unit F85, which executes the pressure control program, is detailed below step by step with reference to the flowchart shown in FIG. 11. It is noted that the pressure control program is continuously executed while the compression molding machine 0 is in operation.

Initially in step S1, the pressure in the housing F2 is measured. More specifically, the central processing unit receives a signal indicative of the pressure in the housing F2 from the pressure sensor F7. Then in step S2, the control unit F85 determines whether or not the pressure in the housing F2 has a value within a first predetermined range. If it is determined in step S2 that the pressure in the housing F2 has the value within the first predetermined range, the pressure in the housing F2 is normal, so that the process returns to step S1.

To the contrary, if it is determined in step S2 that the pressure in the housing F2 is not within the first predetermined range, it is determined in step S3 whether or not the pressure in the housing F2 has the value within a second predetermined range.

In this case, the second predetermined range has an upper limit that is higher than the upper limit of the first predetermined range, and a lower limit that is lower than the lower limit of the first predetermined range. The second predetermined range includes the first predetermined range and a range that can be modified into the first predetermined range. This range can be defined by arbitrarily set values.

If it is determined in step S3 that the pressure in the housing F2 is not within the first predetermined range but within the second predetermined range, then in step S4, the import rate controller and the suction power controller control the flow control valve F83 and the suction unit F84, respectively, and regulate the flow rate of air imported into the housing F2 and suction power of the suction unit, so that the pressure in the housing F2 has a value within the first predetermined range.

To the contrary, if it is determined in step S3 that the pressure in the housing F2 is not within the second predetermined range, then in step S5, the control unit F85 outputs an operation stop signal indicative of abnormality of the pressure in the housing F2.

When the powdery material is supplied from the powdery material supplier 7 into the housing F2, the pressure in the housing F2 is varied. In the above configuration, the agitating feeder F includes the pressure sensor F7 for sensing the pressure in the housing F2, and the pressure control system F8 for receiving a pressure signal outputted from the pressure sensor F7 and controlling the pressure in the housing F2. Accordingly, the pressure in the housing F2 is controlled by the pressure control system F8 so as to keep the pressure in the housing F2 within a predetermined range. Suppressed therefore is influence of variation of the pressure in the housing F2 onto filling uniformity of the powdery material in the die bore.

In the agitating feeder configured as described above, the first degas bore 71c in the air exhaust portion F82 functioning as the gas exhausting device may be connected to the gas inlet port 581c in the air import portion F81 functioning as the gas importing device. In this configuration, air exhausted from the housing F2 through the powdery material supply port F3c can circulate from the inside of the supplying pipe 71b into the gas inlet port F81c through the first degas bore 71c.

Still alternatively, in each of the above embodiments, the number of the agitating rotors may be one, or may be three or more. In addition, each of the agitating rotors may be formed in any shape.

Moreover, the gas allowed to flow by means of the gas flow device is not limited to air, but may be a different kind of gas such as nitrogen. Such gas may be selected appropriately according to the type of the powdery material as well as functions and effects. In place of the pass sensor 72 of the first embodiment described above, there may be provided a flow rate sensor that senses the flow rate of the powdery material.

In place of the gas flow device configured to circulate gas as in the above embodiments, there may be adopted a gas flow device that utilizes only the flow of gas from a gas importing port for guiding air into the housing toward a gas exhaust port for exhausting gas from the housing. Examples of such a gas flow device include a blower, a cooling fan, and an air heater.

The present invention is applicable not only to the rotary compression molding machine according to the embodiments described above, which has a die provided in a turret, but also to a nonrotary compression molding machine.

Other than the above, various modifications may be made to the present invention as long as not departing from the purpose of the present invention.

What is claimed is:

1. An agitating feeder provided in a compression molding machine that includes at least one die having a die bore, an upper punch and a lower punch retained respectively above and below the die so as to be vertically slidable, and a compression mechanism for compressing and molding a powdery material filled in the die bore by the upper punch and the lower punch, the agitating feeder comprising: an agitating rotor for rotating to agitate the powdery material; a housing accommodating the agitating rotor, a first gas flowing rotor, and a second gas flowing rotor; a gas passage located outside of the housing; and a gas flow device for circulating gas in the housing from the first gas flowing rotor through the gas passage and to the second gas flowing rotor.

2. The agitating feeder according to claim 1, further comprising: an outlet bore portion for guiding the gas from a gas supply passage into the housing, wherein the gas supply passage supplies the gas from outside flowing into the housing.

3. The agitating feeder according to claim 2, further comprising:

a pressure sensor for sensing a pressure in the housing; and
a pressure control mechanism for receiving a pressure signal outputted from the pressure sensor and controlling the pressure in the housing.

4. A compression molding machine comprising the agitating feeder of claim 3.

5. A compression molding machine comprising the agitating feeder of claim 2.

6. The agitating feeder according to claim 1, further comprising:

a pressure sensor for sensing a pressure in the housing; and
a pressure control mechanism for receiving a pressure signal outputted from the pressure sensor and controlling the pressure in the housing.

7. A compression molding machine comprising the agitating feeder of claim 6.

8. A compression molding machine comprising the agitating feeder of claim 1.

9. The agitating feeder according to claim 1, wherein the agitating rotor comprises: a first agitating rotor; and a second agitating rotor, wherein the gas circulates from a first vicinity of the first agitating rotor to a second vicinity of the first agitating rotor by way of the first gas flowing rotor, through the gas passage, to the second gas flowing rotor, and to a vicinity of the second agitating rotor.

10. A compression molding machine comprising the agitating feeder of claim 9.

11. The agitating feeder according to claim 1, further comprising a gas flow promoting device for increasing circulation of the gas in the housing.

12. The agitating feeder according to claim 1, further comprising:

a pressure sensor for sensing a pressure in the housing; and
a pressure control mechanism for receiving a pressure signal outputted from the pressure sensor and controlling the pressure in the housing.

13. A compression molding machine comprising the agitating feeder of claim 12.

14. The agitating feeder according to claim 1, further comprising: an outlet bore portion for guiding the gas from a gas supply passage into the housing, wherein the gas supply passage supplies the gas from outside flowing into the housing.

15. A compression molding machine comprising the agitating feeder of claim 14.

16. A compression molding machine comprising the agitating feeder of claim 1.

17. An agitating feeder provided in a compression molding machine that includes at least one die having a die bore, an upper punch and a lower punch retained respectively above and below the die so as to be vertically slidable, and a compression mechanism for compressing and molding a powdery material filled in the die bore by the upper punch and the lower punch, the agitating feeder comprising:

an agitating rotor for rotating to agitate the powdery material;
a housing accommodating the agitating rotor; and
a gas flow device for flowing gas in the housing,
wherein the gas flow device includes, in the housing, a first gas flowing rotor for delivering gas upward, a gas passage allowing the gas delivered by the first gas flowing rotor to flow therethrough, and a second gas flowing rotor for delivering downward the gas having flown through the gas passage.

* * * * *